United States Patent
Nakagawa

(10) Patent No.: US 7,248,403 B2
(45) Date of Patent: Jul. 24, 2007

(54) MICROSCOPIC IMAGE CAPTURE APPARATUS AND MICROSCOPIC IMAGE CAPTURING METHOD

(75) Inventor: Shuji Nakagawa, Tokyo (JP)

(73) Assignee: Olympus Corporation, Tokyo (JP)

(*) Notice: Subject to any disclaimer, the term of this patent is extended or adjusted under 35 U.S.C. 154(b) by 106 days.

(21) Appl. No.: 11/121,369

(22) Filed: May 3, 2005

(65) Prior Publication Data

US 2005/0190437 A1    Sep. 1, 2005

Related U.S. Application Data

(62) Division of application No. 10/655,354, filed on Sep. 3, 2003, now Pat. No. 7,016,109.

(30) Foreign Application Priority Data

Sep. 10, 2002  (JP) .............................. 2002-263667

(51) Int. Cl.
*G02B 21/00*    (2006.01)
(52) U.S. Cl. ........................ 359/380; 359/381; 382/128
(58) Field of Classification Search .................... None
See application file for complete search history.

(56) References Cited

U.S. PATENT DOCUMENTS

| | | |
|---|---|---|
| 5,671,288 A | 9/1997 | Wilhelm et al. |
| 5,757,954 A | 5/1998 | Kuan et al. |
| 6,101,265 A | 8/2000 | Bacus et al. |
| 7,016,109 B2 * | 3/2006 | Nakagawa ............ 359/380 |
| 2004/0202357 A1 | 10/2004 | Perz et al. |
| 2006/0204072 A1* | 9/2006 | Wetzel et al. ........... 382/133 |

FOREIGN PATENT DOCUMENTS

| | | |
|---|---|---|
| JP | 5-232385 A | 9/1993 |
| JP | 6-3600 A | 1/1994 |
| JP | 9-281405 A | 10/1997 |
| JP | 11-211988 A | 8/1999 |
| JP | 11-249021 A | 9/1999 |
| JP | 2000-295462 A | 10/2000 |
| JP | 2001-274973 A | 10/2001 |
| WO | WO 97/20198 A2 | 6/1997 |

* cited by examiner

*Primary Examiner*—Arnel Lavarias
(74) *Attorney, Agent, or Firm*—Frishauf, Holtz, Goodman & Chick, P.C.

(57) ABSTRACT

A microscopic image capturing apparatus and method are provided. First, the entire area of a slide glass on a stage is divided into field size sections (low-magnification sections) of a low-powered objective lens. The stage is transferred perpendicular to an optical axis, and image information is sequentially obtained for each low-magnification section. Each low-magnification section is divided into high-magnification size sections (high-magnification sections), and a high-magnification image is captured using a high-powered objective lens only in high-magnification sections corresponding to a sample. A high-magnification image is generated by correctly maintaining the relative position between the obtained image information and an area corresponding to high-magnification sections which are not captured, and high-magnification composite image information of the sample is generated.

6 Claims, 10 Drawing Sheets

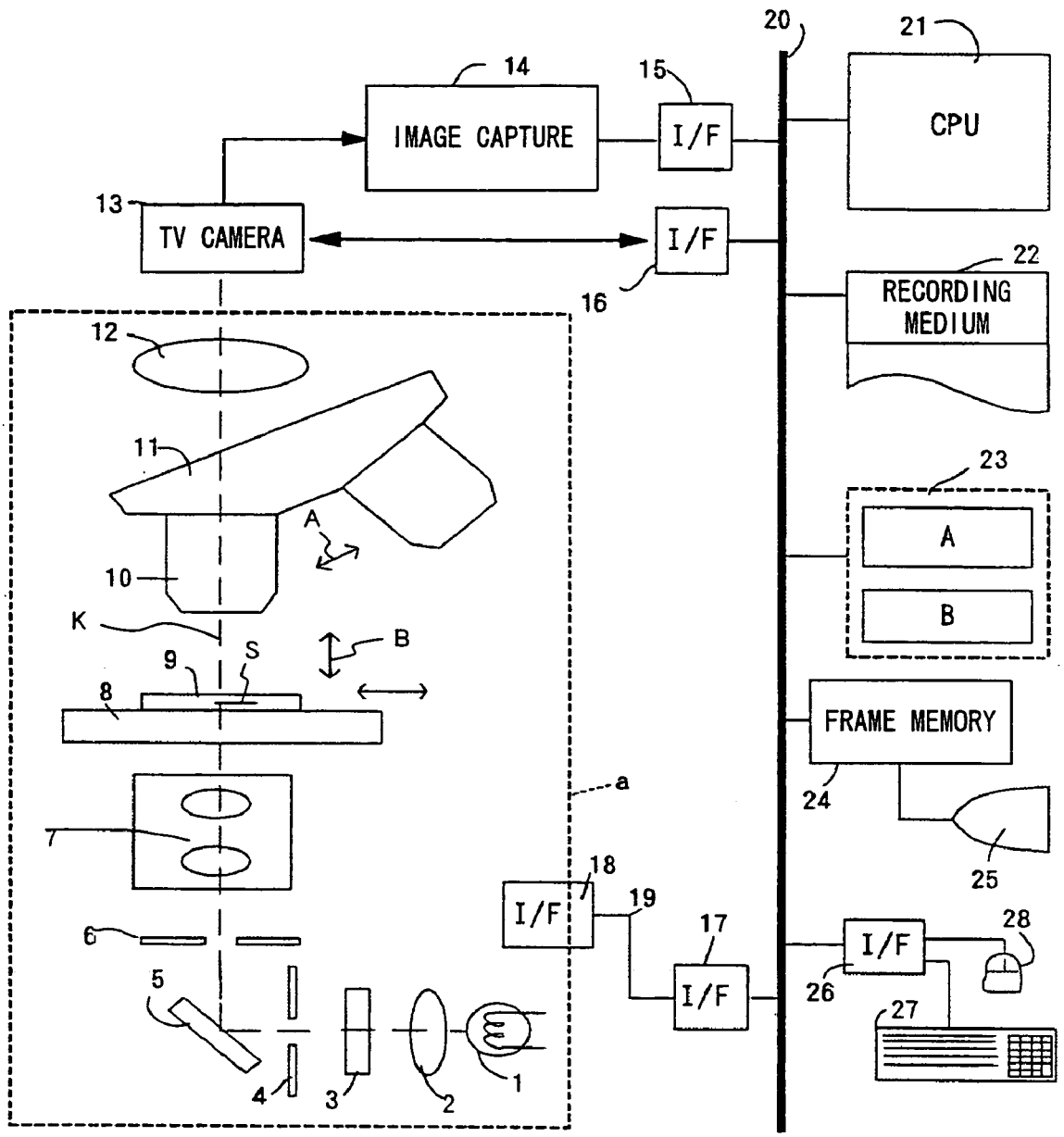
F I G. 1

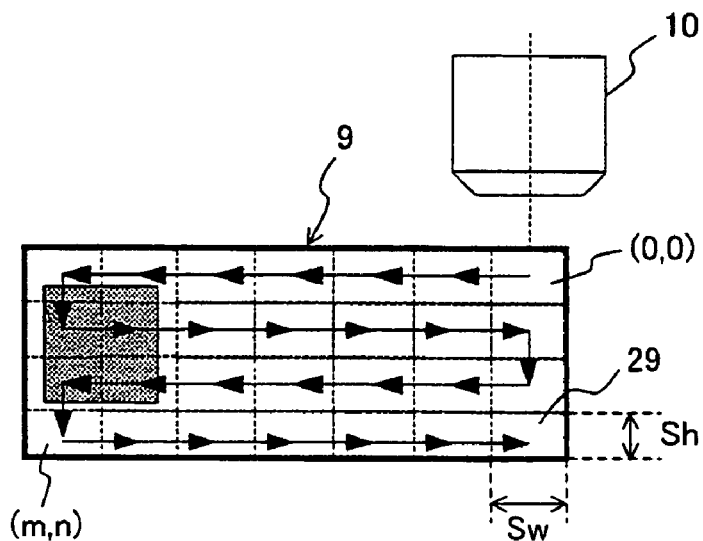
F I G. 2 A
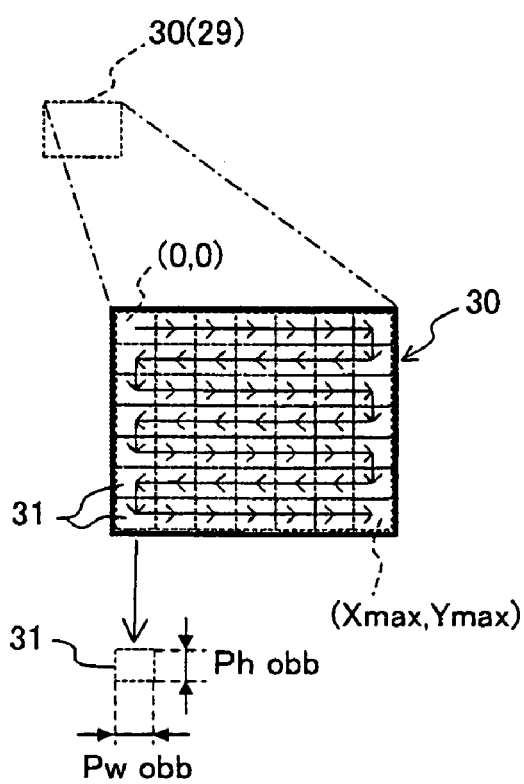
F I G. 2 B

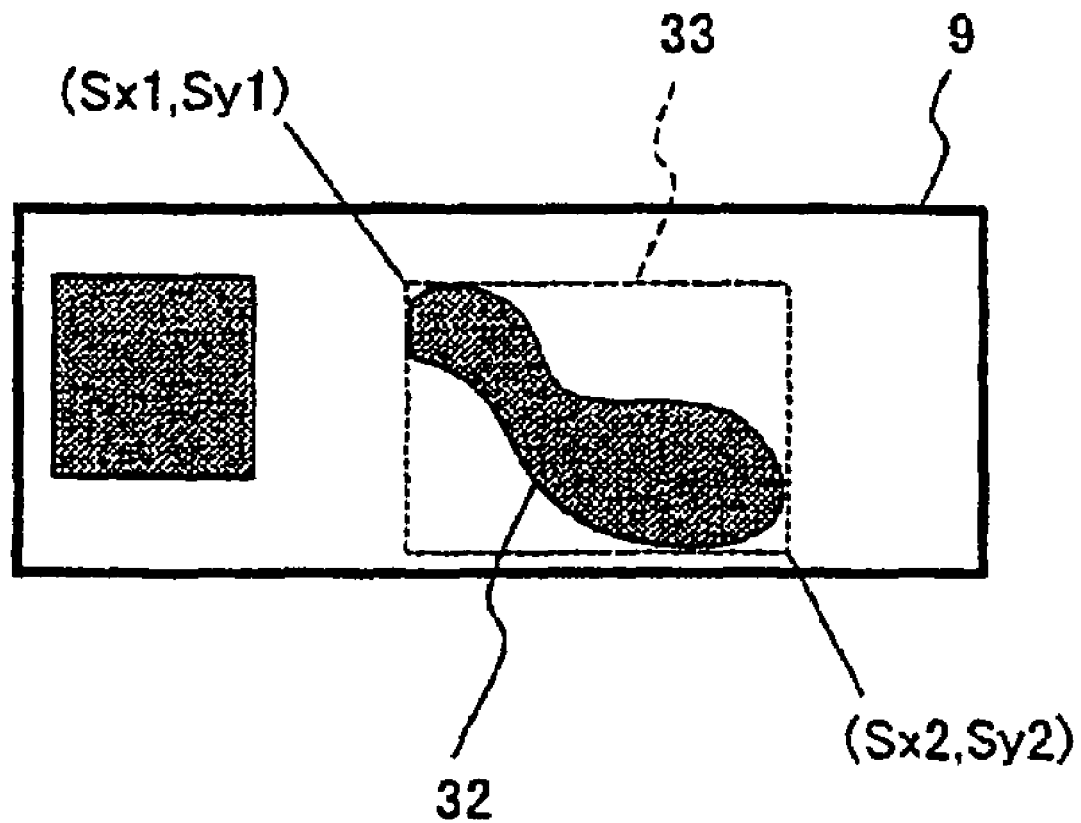
F I G. 4

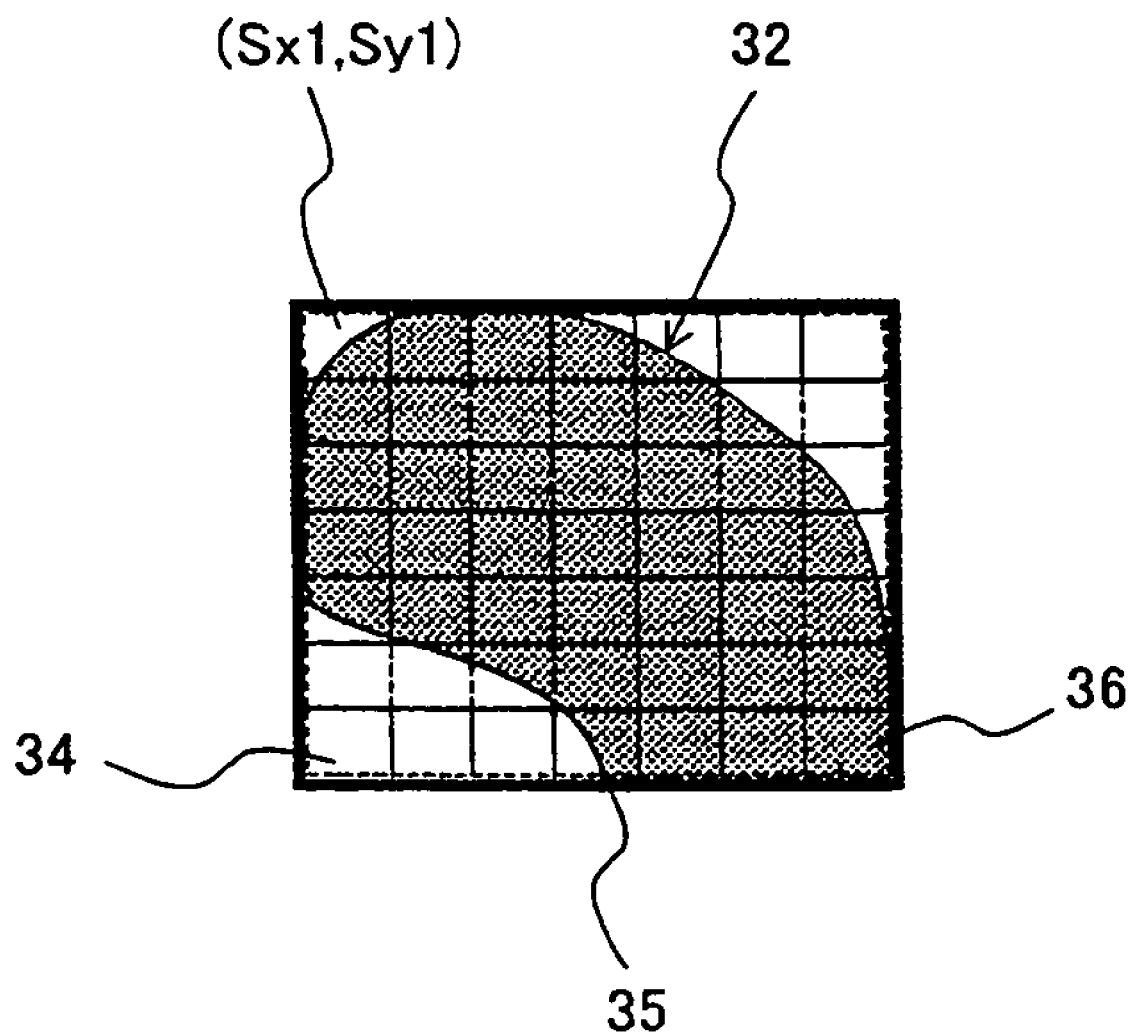
F I G. 5

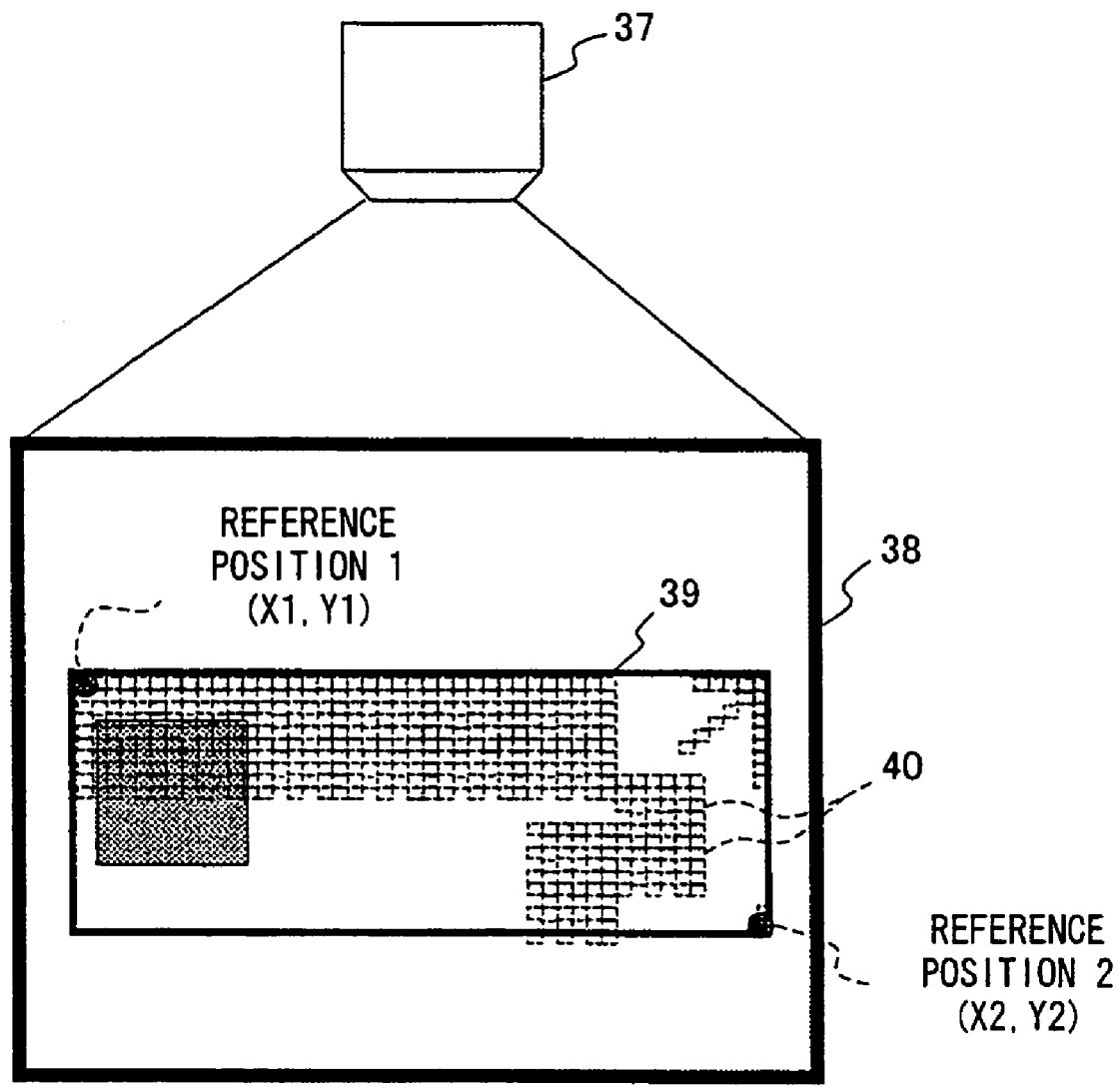
F I G. 6

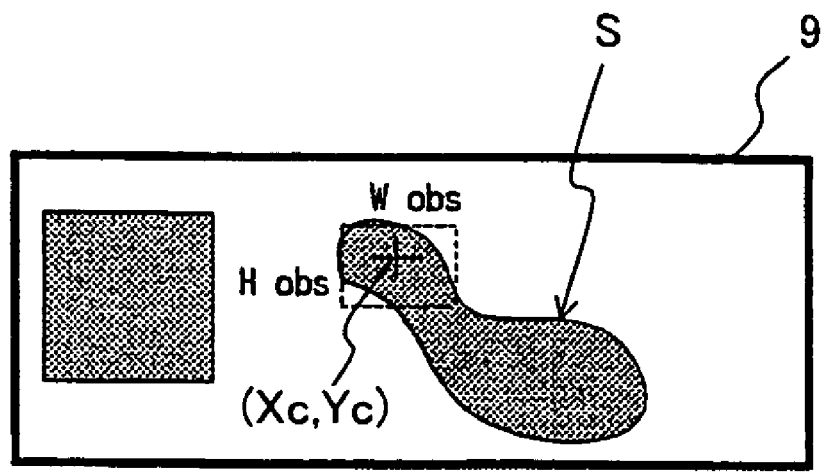
F I G. 8 A
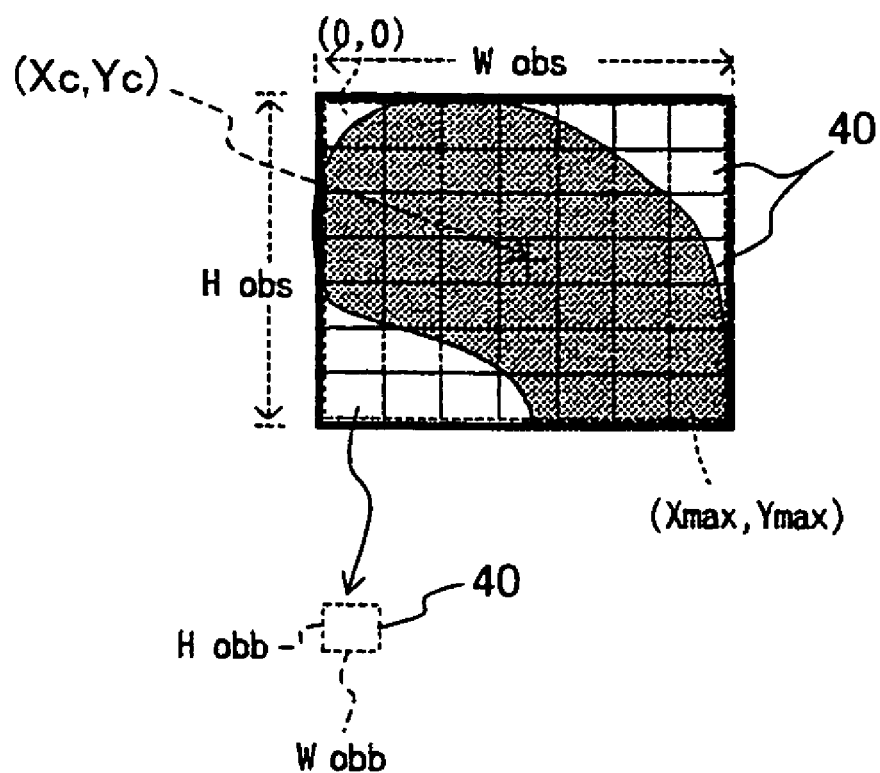
F I G. 8 B

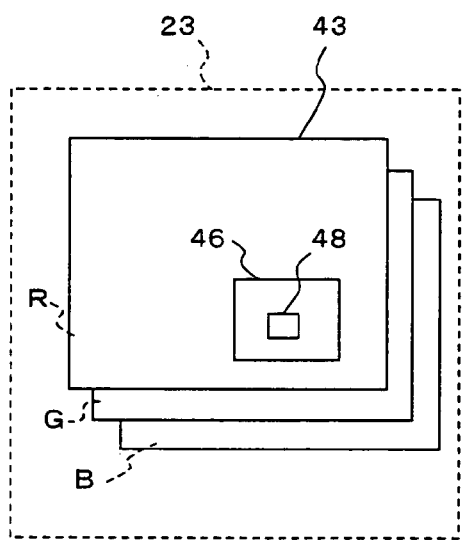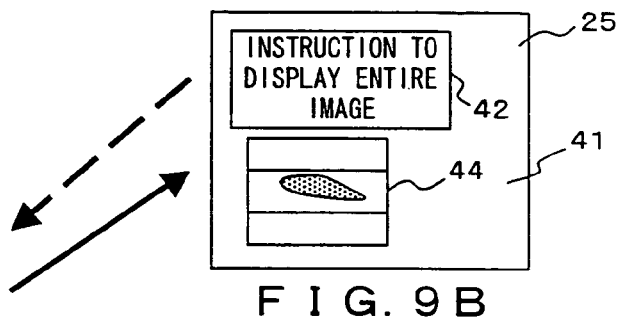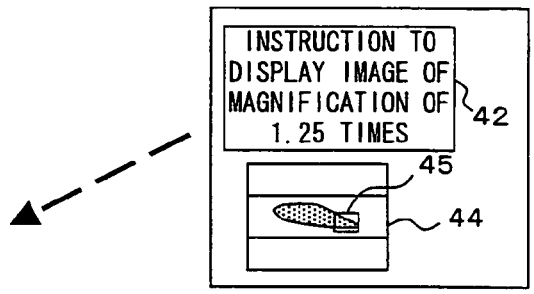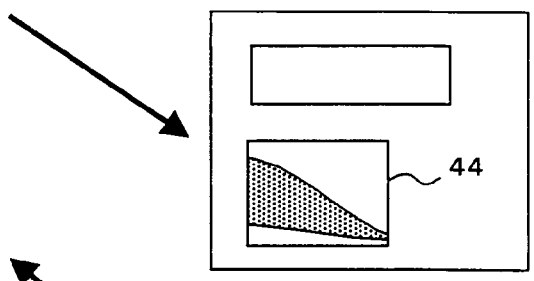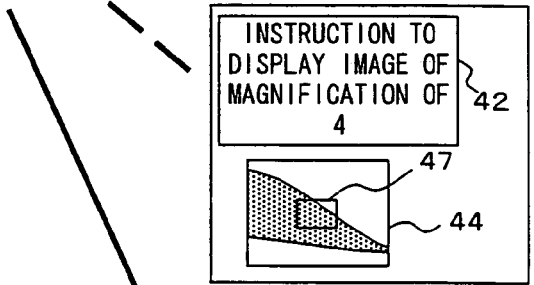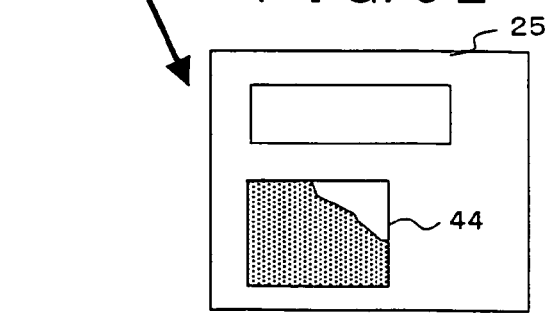
FIG. 9A
FIG. 9B
FIG. 9C
FIG. 9D
FIG. 9E
FIG. 9F

MICROSCOPIC IMAGE CAPTURE APPARATUS AND MICROSCOPIC IMAGE CAPTURING METHOD

CROSS REFERENCE TO RELATED APPLICATION

This application is a Divisional application of U.S. application Ser. No. 10/655,354, filed on Sep. 3, 2003 now U.S. Pat. No. 7,016,109, which is based upon and claims the benefit of priority from the prior Japanese Application No. 2002-263667, filed Sep. 10, 2002, the entire contents of which are incorporated herein by reference.

BACKGROUND OF THE INVENTION

1. Field of the Invention

The present invention relates to a microscopic image capture apparatus and a microscopic image capturing method for capturing a microscopic image of a sample, and more specifically to a microscopic image capture apparatus and a microscopic image capturing method for efficiently capturing a wide-angle field and high-precision microscopic digital image.

2. Description of the Related Art

Conventionally, there has been a method of observing a microscopic image as a digital image. Generally, when a sample is observed, the range observed at a time mostly depends on the magnification of an objective lens. Using a high-powered objective lens, an observation range is small, but a high-precision image can be obtained.

A microscope system for generating a high-resolution and wide-angle field image has been suggested based on the above-mentioned fact and by capturing a high-precision microscopic image depending on the magnification of an objective lens with the overlapping portions taken into account and sequentially combining the captured images (for example, refer to the Japanese patent literature, that is, Japanese Patent Application Laid-open No. 09-281405, page 5 and FIGS. 3 and 4. Hereinafter, the literature is referred to as patent literature 1).

There is also an image display system suggested using a microscope dividing an observation area of a sample image, scanning the stage, capturing divisional images, correcting distortion, and deleting the overlapping portions at the joints, thereby combining the images without inconsistency in relative positions and displaying the resultant image on the display device (for example, refer to the Japanese patent literature, that is, Japanese Patent Application Laid-open No. 11-249021, pages 4 through 6 and FIGS. 1 and 2. Hereinafter, the literature is referred to as patent literature 2).

There also is a microscopic image remote control system suggested as a method of combining images, remotely operating a microscope, repeating divisional capture of a sample of a predetermined magnification, combining obtained images in a two-dimensional relative positions without inconsistency, and obtaining image information with the surrounding portion enlarged around the central position of the entire resultant image (for example, refer to the Japanese patent literature, that is, Japanese Patent Application Laid-open No. 11-211988, pages 4 through 6 and FIG. 1. Hereinafter, the literature is referred to as patent literature 3).

Furthermore, there is a microscopic image synthesis apparatus, etc. suggested for optimizing the overlapping areas with the correction of distortion and shading by capture, and a stage control error taken into account (for example, refer to the Japanese patent literature, that is, Japanese Patent Application Laid-open No. 2001-274973, pages 6 through 8 and FIG. 8. Hereinafter, the literature is referred to as patent literature 4).

The technology of the above-mentioned patent literature 1 can control the capture position with the overlapping portions taken into account depending on the magnification of an objective lens, but unnecessarily computes the images in the positions where no sample image exists. Thus, since the technology wastes time in capturing unnecessary portions, a long entire operating time is required although the optimum composite image can be obtained under the control of the capture position with the overlapping portion taken into account as described above.

Additionally, although the technologies of the patent literature 2 through 4 have suggested various different methods of optimally combining divisional images as in the above-mentioned method, none of them have suggested any efficient consideration of the process relating to the portions where no sample image exists. That is, the images in the positions where no sample image exists are unnecessarily captured.

SUMMARY OF THE INVENTION

The microscopic image capture apparatus according to the present invention includes: a low-magnification dividing device for dividing an entire area of a slide glass on a stage into field size sections of a predetermined low-powered objective lens; a transfer device for relatively transferring the slide glass on the stage in the direction perpendicular to the optical axis of the objective lens by relatively transferring the stage in the direction perpendicular to the axis of the objective lens; an image information obtaining device for obtaining image information for each field size section each time the entire area of the slide glass is sequentially transferred by the transfer device by the field size section of the low-powered objective lens; a high-magnification dividing device for dividing the image information for each field size section obtained by the image information obtaining device into high-magnification size sections corresponding to the magnification of a predetermined high-powered objective lens; a sample image discrimination device for checking whether or not there is sample image information in the image information for each high-magnification size section into which the image information is divided by the high-magnification dividing device, discriminating the high-magnification size section having the image information containing the sample image information as a sample image inclusion section from the high-magnification size section having the image information containing no sample image information as a sample image exclusion section; a high-magnification image capture device for capturing a high-magnification image using the predetermined high-powered objective lens only for the high-magnification size section discriminated as the sample image inclusion section; and an image information generation device for generating high-magnification composite image information about a sample on the slide glass by generating the high-magnification image such that the relative position between the area of the high-magnification size section having the image information obtained from the image captured by the high-magnification image capture device and the area of the high-magnification size section not captured by the high-magnification image capture device can be correctly maintained.

The microscopic image capture apparatus according to the present invention may alternatively include: a macro capture device for collectively capturing the entire area of a slide glass; a macro image information dividing device for dividing image information on the slide glass obtained by the capturing operation by the macro capture device into high-magnification size sections corresponding to the magnification of a predetermined high-powered objective lens; a sample image discrimination device for checking whether or not there is sample image information in the image information for each high-magnification size section into which the image information is divided by the macro image information dividing device, discriminating the high-magnification size section having the image information containing the sample image information as a sample image inclusion section from the high-magnification size section having the image information containing no sample image information as a sample image exclusion section; a high-magnification image capture device for capturing a high-magnification image using the predetermined high-powered objective lens only for the high-magnification size section discriminated as the sample image inclusion section; and an image information generation device for generating high-magnification composite image information about a sample on the slide glass by generating the high-magnification image such that the relative position between the area of the high-magnification size section having the image information obtained from the image captured by the high-magnification image capture device and the area of the high-magnification size section not captured by the high-magnification image capture device can be correctly maintained.

A microscopic image capturing method according to the present invention is used in generating a high-magnification composite image of a predetermined area of a sample, and is configured by the steps of dividing a predetermined area of the sample into field sections corresponding to a high-powered objective lens, checking the presence/absence of the sample image information about the sample for each field section, obtaining a high-magnification image using the high-powered objective lens from the field section determined in the check as having the sample image information, combining the obtained high-magnification images such that they can correspond to the respective relative positions of the field size sections, and generating a high-magnification composite image of the sample.

Thus, especially when a wide-angle field and high-precision image is captured in the conventional methods, it takes a long time only to capture a high-precision, and additionally the capturing operation has to cover a wide-angle field area. Therefore, a long time is wasted in capturing the areas where there are no sample images. However, according to the present invention, only the portions containing sample images are captured, and the portions containing no sample images are assigned, for example, dummy data in generating the entire image, thereby efficiently capturing a high-precision and wide-angle field image.

BRIEF DESCRIPTION OF THE DRAWINGS

FIG. 1 is a schematic diagram showing the entire configuration of the microscopic image capture apparatus according to an embodiment of the present invention;

FIGS. 2A and 2B show the basic principle of the capture control method using the microscopic image capture apparatus according to the present invention;

FIG. 4 shows the capture area (Sx1, Sy1) through (Sx2, Sy2);

FIG. 5 shows an example of generating dummy image information to be combined with the captured image information through a high-powered objective lens;

FIG. 6 is a simple schematic diagram of the capturing method according to the second embodiment of the present invention;

FIGS. 8A and 8B show the method of efficiently generating a high-precision image according to the third embodiment of the present invention.

FIGS. 9A through 9F show the method of displaying an observation image for a high-precision image according to the fourth embodiment of the present invention.

DESCRIPTION OF THE PREFERRED EMBODIMENTS

Figure 3:
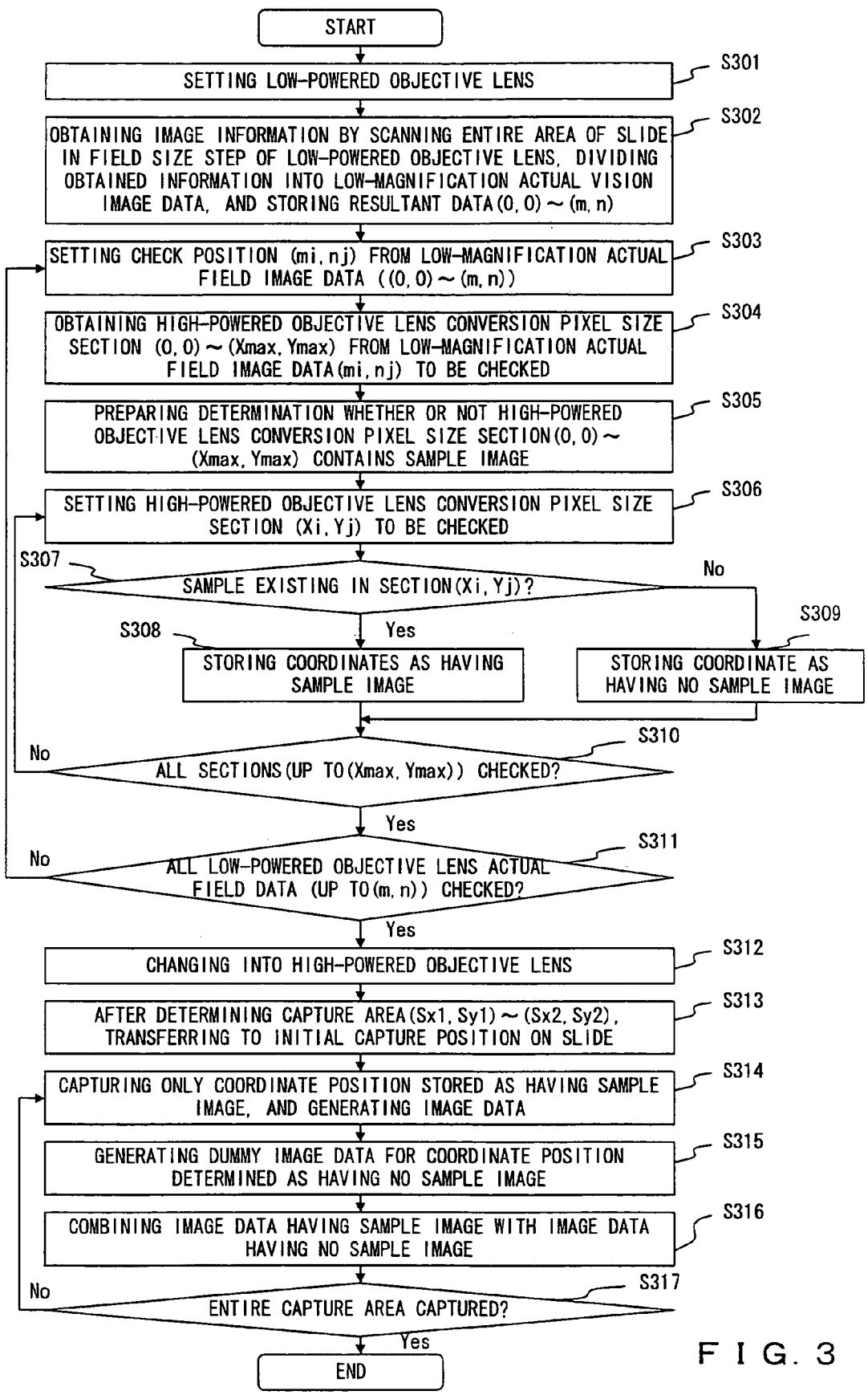
FIG. 3 is a flowchart of the actual capturing procedure based on the basic principle of the capture control method according to the first embodiment of the present invention.

The embodiments of the present invention are described below by referring to the attached drawings.

FIG. 1 is a schematic diagram showing the entire configuration of the microscopic image capture apparatus according to an embodiment of the present invention.

First, an optical observation system is described.

In FIG. 1, the configuration encompassed by broken lines a indicates a microscope unit. In the microscope unit shown in FIG. 1, a light source 1 comprises, for example, a halogen lamp for pass-through illumination, and generates illumination light. The illumination light is first collected by a collector lens 2 as indicated by furthermore longer broken lines within the broken lines a shown in FIG. 1, then passes through various filters 3 comprising, for example, an ND filter, an LBD filter, etc., and is furthermore selected through a vision diaphragm 4, and angle deflected by a mirror 5 in the stage direction, and forms an optical observation axis K.

After the illumination light angle-deflected along the optical observation axis K in the direction of a stage 8 passes through a brightness diaphragm 6 and a condenser lens unit 7, it passes through the aperture for illumination (not shown in FIG. 1) of the stage 8, thereby illuminating the sample S of a slide glass 9 on the stage 8 from below.

Above the stage 8, a revolver 11 holding a plurality of objective lenses 10 is mounted. The revolver 11 can be rotated in the optional directions as indicated by the two arrows A. Thus, the objective lens 10 of a desired magnification can be set in the observation position.

Furthermore, these objective lenses 10 can be freely removed from the revolver 11, and switched into a desired lens. Therefore, a desired magnification can be obtained not only by rotating the revolver 11, but also by replacing the objective lens 10 with a desired lens.

The microscope unit encompassed by the broken lines a comprises a motor driver, a motor, and a driving system mechanism for transferring the rotary driving force of the motor for electrically driving each operation unit although they are not shown in the attached drawings. For example, the revolver 11 is provided with a set of driving control system including a motor driver for rotating the revolver, a motor, a sensor, etc. for the revolver 11. Similarly, the stage 8 is also provided with a driving control system for transferring it vertically and horizontally.

Thus, although the stage 8 is designed to be driven up and down in the Z direction (vertically) for focus control as indicated by the arrow B, it is obvious that the focus control is not limited to the up-and-down driving of the stage 8, but the revolver 11 for holding the objective lens 10 can be designed to be driven up and down.

Although the focus control is not described in detail in the present embodiment, performing control such as storing Z-direction correction data in the memory, etc. in advance, performing autofocus processing in real time, performing fixed one-shot autofocus processing after performing the autofocus processing once as necessary, etc. can be easily realized by the function provided for the microscopic image capture apparatus.

Thus, the sample image of the slide glass 9 input to the objective lens 10 on the optical axis in the optical observation path is led to a TV camera 13 through an intermediate-powered lens 12.

Although the brightness of an image may depend on the capture position of the slide glass 9, the brightness of the image can be controlled by fixing the exposure on the TV camera 13 by the control unit, entirely adjusting the amendment of the brightness level by software, etc.

Furthermore, in FIG. 1, the sample image is shown as being led by the TV camera 13 only, but the present invention is not limited to this application. That is, although not shown in FIG. 1, the sample image can be branched to an eyepiece by a beam splitter to be also observed by the eyepiece. However, since the microscopic image capture apparatus according to the present embodiment aims at digitizing a microscopic image, an eyepiece mainly used for observation with naked eyes is not required.

The sample image captured by the TV camera 13 is compressed by an image capture 14 based on the specifications in, for example, the JPEG format, etc. The control of the capture of a microscopic image by the above-mentioned TV camera 13, the vertical and horizontal transfer of the stage 8, and the operations such as autofocus processing, etc. of all units of the microscope can be performed by a CPU 21.

The control system is described below.

The CPU 21 is connected to a CPU bus 20 to which an I/F (interface) circuit 15 for control of the image capture 14, an I/F circuit 16 for control of the TV camera 13, and an I/F circuit 17 for control of the microscope unit indicated by the broken lines a are connected. Thus, the control of each unit shown in FIG. 1 can be performed by the CPU 21.

Furthermore, a recording medium 22 including a hard disk, etc., memory 23 having two storage areas, that is, an A area and a B area, frame memory 24 for expanding display data for display on a monitor 25, a control I/F circuit 26, etc. for a keyboard 27 or a mouse 28 are also connected to the CPU bus 20.

The CPU 21 loads the control program recorded in the recording medium 22 to the memory 23, and controls each unit according to the loaded control program. An operation control screen display program for displaying an operation control screen on the monitor 25 is also implemented in the control program so that the operator of the microscopic image capture apparatus indicated by the broken lines a can easily control the microscopic image capture apparatus.

The operator can input a necessary instruction by operating the keyboard 27, the mouse 28, etc. to specify the execution of the operation of a microscope, the transfer of a slide, the capture of a microscopic image, the capture of a wide-angle field image, etc.

The CPU 21 controls the illumination light for a microscope, sets the ND filter 3 depending on the type of an objective lens, sets the brightness diaphragm 6, the condenser lens unit 7, etc. Furthermore, it controls the transfer in the directions of the two axes X and Y for control of the capture position of the stage 8, the transfer of the revolver 11 in the Z direction also for focus control, the rotation of the revolver 11 for switch of an objective lens.

Furthermore, the CPU 21 can control the capturing operation of the TV camera 13, the adjustment of the entire image quality by fixing the exposure or correcting the brightness level by software.

The CPU 21 controls the image capture 14 such that the image information about the microscope sample image captured by the TV camera 13 can be converted into digital image information. Then, the digital image information is stored in the memory 23 or the recording medium 22 through the I/F circuit 15 and the CPU bus 20.

Thus, all units can be controlled by the CPU 21. Therefore, the operator can arbitrarily control all units by inputting an instruction to the CPU 21 by operating the keyboard 27 or the mouse 28.

Described below is the control method of efficiently capturing a wide-angle field and high-precision microscope digital image according to the present invention using the microscopic image capture apparatus with the above-mentioned configuration. FIG. 2A shows only the slide glass 9 and the objective lens 10 on the stage 8 shown in FIG. 1. The sections shown by dividing the slide glass 9 shown in FIG. 2A (as originally filed) in the grid pattern are of the actual field size of the low-powered objective lens. Thus, in the present embodiment, the entire slide 9 is divided into the sections of an actual field size 29.

The dimensions of the actual field size 29 of the low-powered objective lens are obtained by the following equations.

$$Sw = W/(mob \times mTV) \quad (1)$$

$$Sh = H/(mob \times mTV) \quad (2)$$

where: mob indicates the magnification of the objective lens 10 (low-powered objective lens); mTV indicates the projection magnification of the TV adapter by the intermediate-powered lens 12; W indicates the longer side of the capture device of the TV camera 13; H indicates its shorter side; Sw indicates the longer side of the actual field size 29; and Sh indicates its shorter side.

For example, assuming that the magnification of the objective lens 10 is 1.25 times, the projection magnification of the TX adapter is 1 time, the size of the device CCD of the TV camera 13 is ½ inch, that is, the longer side is 6.4 mm and the shorter side is 4.8 mm, the longer side Sw and the shorter side Sh of the actual field size 29 are respectively 5.12 mm and 3.84 mm.

The entire area of the slide glass 9 is divided into m×n pieces using the actual field size 29 of the low-powered objective lens of the vertical and horizontal dimensions of Sw×Sh. Assuming that the number of divisions in the longer side direction of the slide glass 9 is m, and the number of divisions in the shorter side direction is n, the number of divisions can be obtained by the following equations.

$$m = (\text{length of the longer side of the slide glass 9})/Sw \quad (3)$$

$$n = (\text{length of the shorter side of the slide glass 9})/Sh \quad (4)$$

For example, assuming that, as described above, the longer side Sw is 5.12 mm and the shorter side Sh is 3.84 mm in the actual field size 29 as described above, and the longer side is 76 mm and the shorter side is 26 mm in the slide glass 9, the entire area of the slide glass 9 is divided into 15×7. In the example shown in FIG. 2A, the area is divided into 7×4 (m=7, n=4) for comprehensibility.

Assuming that the position of divided section of the actual field size 29 of the reference position is the stage coordinate section (0, 0) in the division above, each divided section is converted into a stage coordinate section depending on the above-mentioned number of divisions such that the position of divided section of the actual field size 29 diagonally opposite the position of divided section of the stage coordinate section (0, 0) can be assigned the stage coordinate section (m, n).

Thus, the scanning operation is sequentially performed using the objective lens 10 (low-powered objective lens) for each divided section, that is, for each actual field size 29, while moving the stage 8, each piece of image information is obtained for each actual field size 29, and the obtained image information is stored as the image information for each stage coordinate in the recording medium 22 or the memory 23.

The direction of the arrow continuously and horizontally moving downwards in each actual field size 29 as shown in FIG. 2A indicates the scanning direction using the objective lens 10 (low-powered objective lens). It is obvious that the scanning operation is not limited to the above-mentioned method, but it can be performed constantly from right to left by returning to the rightmost position each time one line is scanned. That is, the stage 8 can be controlled with the transfer precision of the stage 8 taken into account such that the capturing operation can be constantly performed in a fixed direction. Furthermore, the horizontal transfer can be replaced with the vertical transfer.

In the example shown in FIG. 2A, a captured image is scanned based on the actual field size 29 of the low-powered objective lens. In this case, it is also possible to correct the size by performing the scanning operation such that the adjacent sections of the actual field size 29 can overlap with the transfer precision of the stage 8 taken into account.

In any case, the image information corresponding to the stage coordinate section of the actual field size 29 can be obtained regardless of the direction and order of the scanning operation. The image information is recorded as the brightness information about an image. The brightness information about the three elements R, G, and B can be recorded, or only the G brightness information can be recorded.

FIG. 2B shows the image information obtained by the capture of the field size 29 using the low-powered objective lens as described above. Image information 30 shown in FIG. 2B is obtained by the image capture 14, and is configured by the pixel size of the image capture 14. That is, assuming that the pixel size of the image capture 14 is Pw pixels×Ph pixels, the image information 30 about the actual field size 29 comprises Pw×Ph pieces of brightness information. For example, if the pixel size of the image capture 14 is Pw=640 and Ph=480, the image information 30 about the actual field size 29 comprises 640×480 pieces of brightness information.

The image information 30 about the pixel size of the image capture 14 is further divided into the size sections 31 corresponding to the field size of a high-powered objective lens as shown in FIG. 2B. If the pixel size of the image capture 14 is Pw pixels×Ph pixels, the magnification of the low-powered objective lens is mobs, and the magnification of the high-powered objective lens is mobb as described above, then the pixel size of the size section 31 converted into the field size of the high-powered objective lens can be obtained by the following equations.

$$Pwobb = Pw/(mobb/mobs) \quad (5)$$

$$Phobb = Ph/(mobb/mobs) \quad (6)$$

where the number of pixels of the longer side is PWobb, and the number of pixels of the shorter side is Phobb.

For example, if Pw=640, Ph=480, mobb=1.25, mobs=20, then Pwobb=40 pixels and Phobb=30 pixels, and the image information 30 of the image capture pixel size 640×480 obtained by the image capture 14 from the actual field size 29 of the low-powered objective lens is divided into 16×16. In the example shown in FIG. 2B, it is divided into 7×7 for comprehensibility.

Assuming that the position of divided section of the size section 31 of the reference position is the coordinate section (0, 0) in the stage coordinate of the actual field size 29 in the division above, each divided section is converted into a coordinate section in the stage coordinate depending on the above-mentioned number of divisions such that the position of divided section of the size section 31 diagonally opposite the position of divided section of the coordinate section in the stage coordinate (0, 0) can be assigned the coordinate section in the stage coordinate (Xmax, Ymax).

Then, for example, it is sequentially checked whether or not the image of the sample image is contained in the image information about 40×30 pixels for each divided section obtained by dividing the information into 16×16, that is, for each size section 31.

The direction of the arrow continuously and horizontally moving downwards in each size section 31 as shown in FIG. 2B indicates the checking direction as described above. It is obvious that the scanning operation is not limited to the above-mentioned method, but it can be performed constantly from right to left by returning to the rightmost position each time one line is checked. Furthermore, the horizontal transfer can be replaced with the vertical transfer.

The above-mentioned check is made on all sections of the actual field size 29, and the coordinate section in the stage coordinate of the size section 31 containing an image of the sample image is stored. Then, a capturing operation is performed using a high-powered objective lens only on the size section 31 containing an image of the sample image, and the high-precision image information about, for example, 640×680 pixels is obtained for each size section 31.

Thus, the image information about a low-magnification field size obtained using a low-powered objective lens is divided into image information about a high-magnification field size corresponding to a field size of a high-powered objective lens, it is checked whether or not there is a sample image in each piece of image information about a high-magnification field size, and high-precision image information is obtained using a high-powered objective lens only from the high-magnification field size portion determined to have a sample image, thereby efficiently generating a wide-angle field and high-precision image.

In the above-mentioned example, the entire area of the slide glass 9 is divided into sections of a field size of a low-powered objective lens, the image information about a low-magnification field is sequentially obtained and stored in the memory, etc., the image information about a low-magnification field is individually read, the read information is divided into sections of a field size of a high-powered objective lens, and the presence/absence of a sample image is detected. It is also possible to divide the obtained image information about the field size of the low-powered objective lens into sections of the field size of the high-powered objective lens while control is being transferred to the next position of the field size of the low-powered objective lens.

FIG. 3 is a flowchart of the actual capturing procedure used according to the basic principle according to the first embodiment of the present invention. The capturing procedure is used by the control of the CPU 21 shown in FIG. 1. In FIG. 3, a low-powered objective lens is first used (S301).

In this process, when the operator inputs the "start of capture" button (not shown in the attached drawings) on the control screen displayed on the monitor 25, the CPU 21 controls the rotation of the revolver 11 of the microscope unit indicated by the broken lines a shown in FIG. 1 to set the lowest-powered objective lens of the objective lens 10.

Then, the entire area of the slide glass 9 is scanned for each actual field size 29 (refer to FIG. 2A) of the low-powered objective lens using the above-mentioned low-powered objective lens to sequentially obtain the image information about a low-magnification actual field size of the stage coordinate sections (0, 0)~(m, n) depending on the actual field size 29 of the low-powered objective lens and the number of divisions m×n obtained from the size of the slide glass 9, and the obtained image information about a low-magnification actual field is sequentially stored in, for example, the A area of the memory 23 (S302).

Then, the position (mi, nj) to be checked is set according to the image information about a low-magnification actual field of the stage coordinate section (0, 0)~(m, n) (S303).

In this process, the position of the image information about a low-magnification actual field to be checked is sequentially set from the stage coordinate section (0, 0) to the stage coordinate section (m, n), to check the presence/absence of the image information about a sample image, and the initial value is (0, 0). In the stage coordinate section (mi, nj) of the check position, mi=0~m, nj=0~n.

Then, the image information about a low-magnification actual field (mi, nj) to be checked is divided into high-powered objective lens conversion pixel size sections (0, 0)~(Xmax, Ymax) (S304).

As shown in FIG. 2B, this process is performed by dividing the image information 30 about the low-magnification actual field size 29 into the size sections 31 corresponding to the field size of the high-powered objective lens, and each of the divided size sections 31 is set as the coordinate sections in the stage coordinate (0, 0)~(Xmax, Ymax). The size section 31 for each coordinate section in the stage coordinate (0, 0)~(Xmax, Ymax)is referred to as a high-powered objective lens conversion pixel size section.

Then, preparations are made to determine whether or not there is image information about a sample image in the high-powered objective lens conversion pixel size sections (0, 0)~(Xmax, Ymax) in the image information about a low-magnification actual field (mi, nj) (S305).

In this process, the image information about a low-magnification actual field (mi, nj) is loaded from the memory 23, a threshold is set in the brightness information indicated by the image information for determination of the presence/absence of a sample image, the initial position in which the high-powered objective lens conversion pixel size section is checked is set, etc.

In setting the above-mentioned threshold, the brightness value of the image information is equal to the brightness value of the background if there is no sample image data in the image information, and the brightness value is somewhat lower than the brightness value of the background if there is any sample image data in the image information. Therefore, when an observation is made in a bright vision, a set threshold is set close to and lower than the brightness value of the background.

The initial position for a check is set to the coordinate section in the stage coordinate (0, 0). Thus, preparations are made to check the high-powered objective lens conversion pixel size sections (0, 0)~(Xmax, Ymax).

Then, the position (Xi, Yj) of the high-powered objective lens conversion pixel size section is set (S306).

In this process, the initial value is (0, 0) as described above, and the settings of the positions are sequentially made in an ascending order up to i=0~max, j=0~max and in the position (Xi, Yj).

Then, it is determined whether or not there is a sample in the section of the set position (Xi, Yj) (S307).

In this process, it is determined whether or not there is image information about a sample image in the image information in the section of the position (Xi, Yj). The determination is made to detect the presence/absence of a sample image based on the image brightness information suggested in the Japanese Patent Application Laid-open No. 2000-295462 which is the technology filed by the applicant of the present invention. Using the technology of the Japanese Patent Application Laid-open No. 2000-295462, the presence/absence of a sample image can be detected with the noise such as dust, etc. removed.

When it is determined that there is any sample image data in the image information in the section in the position (Xi, Yj) (YES in S307), it is determined that there is a sample image, and the corresponding coordinates are stored (S308).

In this process, the coordinate position of the section in the position (Xi, Yj) is stored, and can be stored as the position information on the slide glass 9 or the coordinates on the stage 8.

On the other hand, if it is determined that there is no sample image data in the image information in the section in the position (Xi, Yj) (NO in S307), then it is determined that there is no sample image, and the corresponding coordinates are stored (S309).

In this process, the coordinates of the section in the position (Xi, Yj) determined to have no sample image are stored in the same method as the coordinate storing method in which it is determined that there is a sample image.

After the process in S308 or S309, it is determined whether or not the presence/absence of a sample image has been checked on all sections, that is, the sections up to the position (Xmax, Ymax) for the high-powered objective lens conversion pixel size section (S310).

Unless all sections have been checked (NO in S310), control is returned to S306, the high-powered objective lens conversion pixel size section to be checked next is set, and the processes in S307 through S310 are repeated. If it is determined that the checking the presence/absence of a sample image has been completed in the repetitive processes (YES in S310), then it is determined whether or not all low-powered objective lens actual field data (up to (m, n)) has been checked (S311).

In this process, it is determined whether or not the above-mentioned check has been completed on the image information 30 in the stage coordinate sections (0, 0)~(m, n) of the actual field size 29 of the low-powered objective lens shown in FIG. 2A.

Unless all low-powered objective lens actual field data has been checked, control is returned to S303, and the low-powered objective lens actual field data in the position (Xi, Yj) to be checked next is set, and the processes in S303 through S311 are repeated.

The image information 30 in the sectional positions (0, 0)~(m, n) obtained by the capture using the actual field size 29 of the low-powered objective lens of the slide glass 9 in the low-magnification is divided into sections of a field size of a high-powered objective lens, it is determined on all divided sections of all areas of the slide glass 9 whether or not the sample image data is contained in the image information, and the coordinates of the positions containing and not containing sample image data are separately stored.

If it is determined that the check has been completed on all low-powered objective lens actual field data (0, 0)~(m, n) (YES in S311), then the objective lens is switched into a high-powered objective lens (S312).

In this process, the revolver 11 is turned, and the objective lens 10 is switched from the low-powered objective lens of the actual field size 29 to the high-powered objective lens of the size section 31. Thus, preparations are made to capture a wide-angle field and high-precision image.

Next, the capture area (Sx1, Sy1)~(Sx2, Sy2) to be captured by the switched high-powered objective lens is determined, and the stage 8 is moved such that the position (Sx1, Sy1) which is the initial capture position on the slide glass can be set on the optical axis of the high-powered objective lens (S313).

FIG. 4 shows the capture area (Sx1, Sy1)~(Sx2, Sy2) determined to be captured by the high-powered objective lens. The capture area is indicated by the broken lines 33 encompassed by the horizontal area represented by the smallest (leftmost in FIG. 4) X coordinate Sx1 and the largest (rightmost in FIG. 4) X coordinate Sx2 in the X coordinates in the sectional position determined as containing a sample image 32 shown in FIG. 4 stored in the process in S308 and the vertical area represented by the smallest (uppermost in FIG. 4) Y coordinate Sy1 and the largest (lowermost in FIG. 4) Y coordinate Sy2 in the Y coordinates in the sectional position determined as containing a sample image 32 shown in FIG. 4 stored in the process in S308.

The initial position of a capture area is represented by the coordinates (Sx1, Sy1), and the optical axis of the high-powered objective lens is relatively transferred to the sectional area (sectional area corresponding to the above-mentioned high-powered objective lens conversion pixel size section) in the initial position.

Then, the image information is generated by sequentially capturing only the sectional area in the coordinate position stored in the process in S308 as containing a sample image in the area (Sx1, Sy1)~(Sx2, Sy2) in which the sample image is contained (S314).

In this process, the high-precision sample image of the high-powered objective lens conversion pixel size section captured by the TV camera 13 through the objective lens 10 is digitized by the image capture 14 and image information is generated.

No actual capture is performed but dummy image information is generated on the sectional area in the coordinate position stored as having no sample image in the process in S309 above (S315).

The dummy image information is prepared in advance as image information for the background whose RGB brightness is adjusted to match the background color so that the dummy image information can be combined with the image information about the actual capture area containing a sample image with consistency between the combined images.

FIG. 5 shows an example of generating dummy image information and retrieved only the area near the capture starting position in the capture area (Sx1, Sy1)~(Sx2, Sy2) shown in FIG. 4. As shown in FIG. 5, the high-powered objective lens conversion pixel size section in the capture area (Sx1, Sy1)~(Sx2, Sy2) contains a no sample image area 34, a sample image partially containing area 35, and a sample image filled area 36.

Among them, only one image is captured in the coordinate position in which no sample is contained as in the no sample image area 34 so that it can be used as dummy image information. Furthermore, the RGB brightness information about a portion containing no sample can be retrieved from an area in a coordinate position where a portion containing a sample and a portion containing no sample coexist as in the sample image partially containing area 35, and dummy image information can be generated according to the retrieved brightness information.

A portion containing no sample is detected by setting a predetermined threshold for RGB brightness information. For example, when an observation is made in a bright vision, a portion containing no sample is represented in white, and a portion where each value of the RGB brightness information is close to the maximum value is detected.

Thus, the actually captured image information having a sample image and the dummy image information having no sample image are combined such that the mutual relative positions can be consistent with each other, and the combined image information is stored in the B area in the memory 23 or the recording medium 22 (S316).

Then, it is determined whether or not all capture areas have been captured (S317). In this determination, if the area containing the sample image in the capture area (Sx1, Sy1)~(Sx2, Sy2) is not completely captured (NO in S317), then control is returned to S314, and the stage 8 is transferred to the next capture check position, the processes in S314 through S317 are repeated, and the presence/absence of a sample image is checked, thereby generating image information.

Thus, if the area containing the sample image in the capture area (Sx1, Sy1)~(Sx2, Sy2) is completed after the above-mentioned processes are sequentially repeated, then it is determined that the capture in the capture area has been completed (YES in S317), thereby terminating the process. If there are still area having no sample image remaining when the process terminates, then the dummy image information is assigned to all these areas.

Thus, a wide-angle field and high-precision microscopic image can be efficiently captured. Although the sample image 32 shown in FIG. 4 is a wide-angle field and low-magnification sample image captured by a low-powered objective lens, the same sample image is obtained as wide-angle field and high-precision image information in the memory 23 in the above-mentioned process.

Thus, in the first embodiment, the objective lens 10 of the microscope unit indicated by the broken lines a shown in FIG. 1 is set as a low-powered objective lens, image information is obtained by scanning the entire area of the slide glass 9 based on the actual field size of the low-powered objective lens, the obtained image information is divided into high-powered objective lens conversion pixel size sections as a set of small areas, an area having a sample image is detected from among the set of small areas, only the areas containing the sample images are scanned using a high-powered objective lens to obtain high-precision image information, and the obtained information is combined with the dummy image information about an area having no sample image, thereby generating a wide-angle field and high-precision image.

When a sample image is displayed, a wide-angle field and high-precision composite image generated based on an image of a high-powered objective lens is used. The switch from a low-powered objective lens to a high-powered objective lens, and the switch in display position are performed in the image data processing based on a wide-angle field and high-precision composite image, and image data is generated and displayed by adjusting the desired magnification and position.

The image information about the entire slide area obtained by a scanning operation using a low-powered objective lens is used in determining the position in which a sample image is contained based on the size section converted into field of a high-powered objective lens, but is not used in displaying a low-magnification image on a slide.

Thus, according to the first embodiment, each piece of image information obtained by capturing the entire area of a slide using a low-powered objective lens is divided into sections of an actual field size of a high-powered objective lens, the presence/absence of a sample image in a divided area is detected, and only a divided area containing a sample image is captured by a high-powered objective lens. Therefore, a microscopic image capture apparatus capable of efficiently capturing a wide-angle field and high-precision microscopic image and reducing the required image storage capacity can be successfully provided.

In another method, the low-powered objective lens can be replaced with a macro capture device to simultaneously capture the entire area of the slide glass 9 and divide the captured image information into high-powered objective lens conversion pixel size sections. This method is described below as the second embodiment of the present invention.

FIG. 6 is a simple schematic diagram showing the capturing method according to the second embodiment of the present invention. In this embodiment, the entire area of the slide glass 9 is captured using a macro capture device 37 provided separate from the microscope unit indicated by the broken lines a shown in FIG. 1, and a position in which a sample image is contained is detected from image information 39 about the entire area of the slide glass 9 obtained in a macro capture area 38, and the sample image presence/absence coordinates obtained when the position is converted in a field size 40 of a high-powered objective lens are detected, thereby generating a wide-angle field and high-precision image.

Thus, when a macro capture device is designed separate from the microscope unit, the slide glass 9 has to be reset. However, as disclosed in the Japanese Patent Application Laid-open No. H06-003600 by the applicant of the present invention, the XY state similar to the microscope unit is provided for the macro capture device, and an adjusting operation is performed to-allow the microscope unit and the stage to match in position.

Furthermore, when macro capture is performed, the mounting position of the slide glass 9 on the stage is fixed so that it can be determined in which pixel position in the captured image information the slide glass 9 is located. The mounting position of the macro capture device is not changed after adjustment.

Assuming that the projection magnification of the TV camera adapter of the microscope unit is 1 time, and the longer side of the capture device is 6.4 mm, the actual field size of the magnification of 20 times of the high-powered objective lens is 0.32 mm by the equation (1). Furthermore, assuming that the longer side of the actual field size of the macro capture area 38 is 80 mm, and the number of pixels of the longer side of the macro captured image is 640, the pixel size of the longer side of the area corresponding to the field size of the high-powered objective lens for the macro captured image is 2.54 pixels.

According to the above-mentioned macro captured image information (refer to the macro capture area 38 shown in FIG. 6), the reference position information (refer to reference position 1 (X1, Y1) and reference position ((X2, Y2) shown in FIG. 6) about the slide glass 9 of the macro captured image information, and the field size conversion pixel information (refer to the field size 40 of the high-powered objective lens shown in FIG. 6) about the high-powered objective lens for the macro captured image, the presence/absence information about a sample image can be detected for each field size when the field size of the high-powered objective lens is computed according to the macro captured image information.

Figure 7:
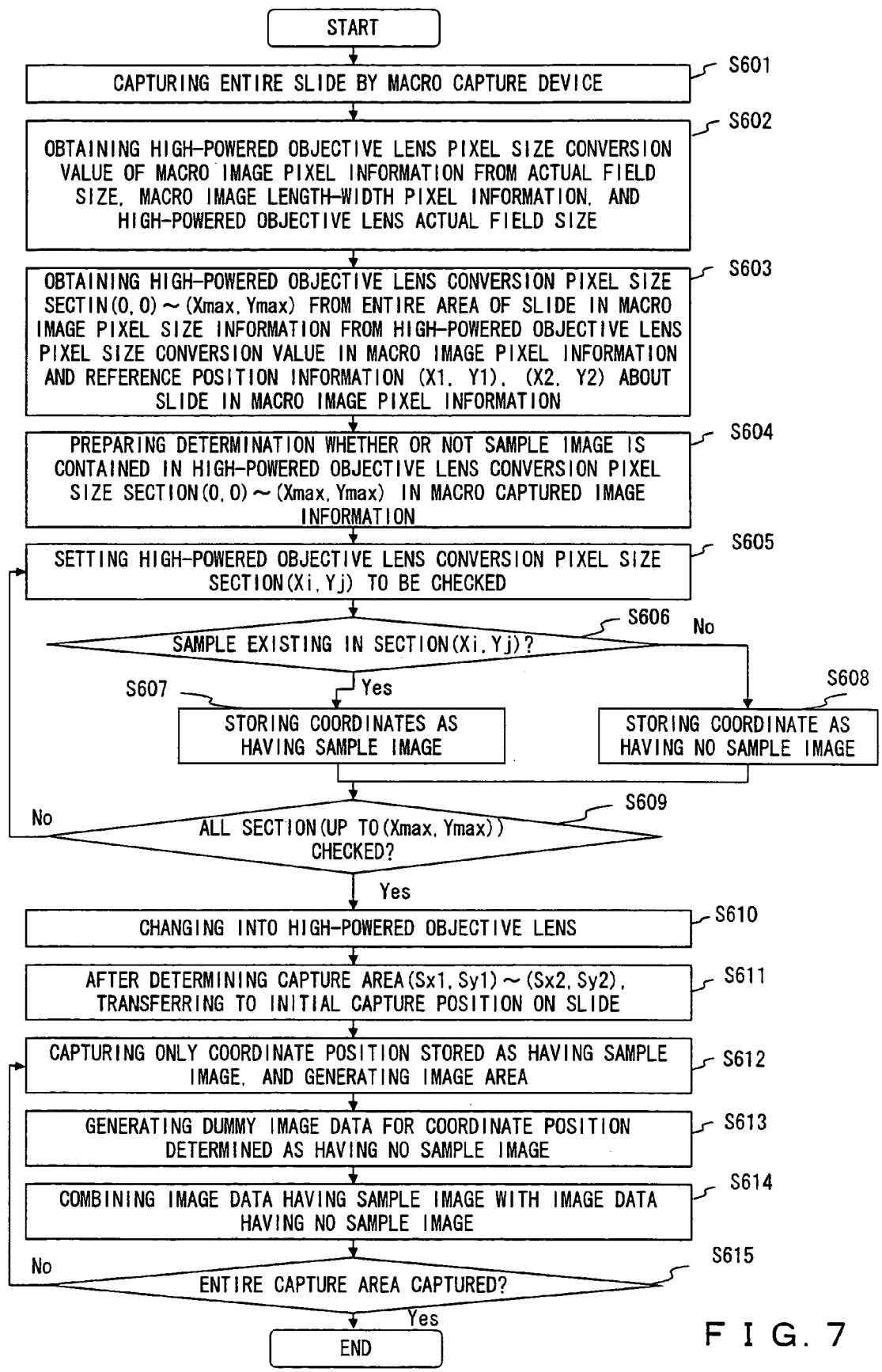
FIG. 7 is a flowchart of an example of the process relating to the macro capture.

FIG. 7 is a flowchart of an example of the process relating to the above-mentioned macro capture. The process relating to the above-mentioned macro capture is represented by the process procedure in S601 through S609 of the flowchart shown in FIG. 7. The subsequent process procedure in S610 through S615 is the same as the process procedure in S312 through S317 shown in FIG. 3. Thus, a wide-angle field and high-precision image can be efficiently generated.

In the above-mentioned example, the macro capture device is used separate from the microscope unit. However, as a microscope provided with a macro lens in advance, the applicant of the present invention has disclosed the microscope in the Japanese Patent Application Laid-open No. H05-232385. Using the microscope provided with the macro lens, the slide glass 9 can be mounted on the same stage, and a wide-angle field and high-precision image can be efficiently generated without resetting the slide glass 9.

Furthermore, in the macro capture, a scanner can also be used without a macro lens. In this case, since the slide glass 9 is not always placed in a specified position of the scanner, the capture cannot be performed with the slide glass 9 placed in a predetermined position, thereby generating a displacement in the XY position of a captured image or a rotation of the image. Therefore, the displacements have to be corrected.

In this case, as in the reference position 1 (X1, Y1) and the reference position 2 (X2, Y2) in the image information 39 about the entire area of the slide glass 9 shown in FIG. 6, a reference position mark is added to the diagonally opposite positions of the slide glass 9 so that the reference mark positions are image-recognized, and the displacement of the XY positions and the rotation can be easily corrected.

In any case, by performing the macro capture, the sample image presence/absence information can be obtained from a macro captured image for each field size of a high-powered objective lens according to the actual field size of the macro captured image, the slide glass reference position information about a macro captured image, the number-of-pixels information about a macro captured image, and the pixel size of the field size conversion of a high-powered objective lens, the necessity of capture is determined according to the sample image presence/absence information, and a wide-angle field and high-precision image can be efficiently generated using the high-powered objective lens.

Thus, only the information in the position containing a sample image is extracted from the image information obtained by capturing at a low-magnification, and a scanning operation is performed on the slide glass using a high-powered objective lens according to the above-mentioned information, thereby obtaining only the image in the position containing the sample image. Thus, the obtained image is combined with the image in the position containing no sample image, thereby quickly generating a wide-angle field and high-precision image.

Thus, according to the second embodiment of the present invention, after collectively capturing the entire area of the slide glass by a macro capture device, the captured image is divided into sections of an actual field size of a high-powered objective lens, the presence/absence of a sample image in the divided areas is detected, and only the divided area determined to contain a sample image is captured by a high-powered objective lens. Therefore, a microscope image capture apparatus capable of capturing a wide-angle field and high-precision microscope image in a shorter processing time can be provided.

In the above-mentioned first and second embodiments, the presence/absence of a sample image is detected from the image information obtained by a low-powered objective lens or a macro capture device after capturing the entire area of the slide glass 9, and only the portion containing a sample image is captured using a high-powered objective lens in the entire area of the slide glass 9 based on the above-mentioned detection, thereby generating a wide-angle field and high-precision image. However, when an observer clearly indicates a desired capture position, a high-precision image can be generated for the minimal area of the clearly indicated desired capture position as described below in detail as the third embodiment of the present invention.

FIGS. 8A and 8B show the method of efficiently generating a high-precision image in the third embodiment of the present invention. FIG. 8A shows the sample S of the slide glass 9 being observed by any objective lens, the central observation position (Xc, Yc) of the sample S, and the field size Wobs×Hobs of the low-powered objective lens around the central observation position (Xc, Yc).

FIG. 8B(b) is an enlarged view of the field size Wobs× Hobs of a low-powered objective lens around the above-mentioned central observation position (Xc, Yc), and shows the state of dividing the field size Wobs×Hobs of the low-magnification by the field size 40 of a high-powered objective lens.

Assume that the observer operates an instruction button or a slide button on the control screen area (not shown in the attached drawings) of the monitor 25 using the keyboard 27 or the mouse 28 shown in FIG. 1 while observing the observation moving picture (partial image shown in FIG. 8A moved vertically and horizontally on the monitor 25 depending on the transfer of the slide glass 9) of the microscope displayed on the monitor 25 shown in FIG. 1, and freely changes the position of the objective lens 10 and the stage 8 of the microscope unit indicated by the broken lines a shown in FIG. 1 so that the desired observed portion of the sample S shown in FIG. 8A can be displayed on the monitor 25.

The observer determines the desired capture position in the above-mentioned operation, and inputs the capture start button displayed in the control screen area of the monitor 25. Thus, the area Wobs×Hobs corresponding to the field size of the low-powered objective lens is determined. Furthermore, based on the central observation position (Xc, Yc) of the area Wobs×Hobs corresponding to the field size of the low-powered objective lens and the divided block of an actual field size of the high-powered objective lens for capture of necessary portions using a high-powered objective lens, the capture position is determined.

For example, as shown in FIG. 8B, the upper left block of the determined area Wobs×Hobs corresponding to the low-powered objective lens field size is set as (0, 0), and the lower right block is set as (Xmax, Ymax). With this configuration, the capture position of the block (Xi, Yj) (i=0~Xmax, j=0~Ymax) is calculated by the following equations.

$$Xi=(Xc-Wobs/2)+(Wobb/2)\times(i+1) \qquad (7)$$

$$Yj=(Yc-Hobs/2)+(Hobs/2)\times(j+1) \qquad (8)$$

The stage 8 is transferred such that the plurality of divided capture positions can be position of the optical axis of the high-powered objective lens, the capturing operation is performed using the high-powered objective lens, the entire image is generated such that the relative positions can be consistent with each other, and the generated image is stored in the memory 23 or the recording medium 22.

In the above-mentioned example, the desired capture position is set as the field size corresponding to a low-powered objective lens, but it can also be set as the field size of any magnification. Additionally, a desired capture position is not limited to one position, but a plurality of desired capture positions can be determined. Furthermore, a plurality of areas of a field size corresponding to a low-powered objective lens can be set as a capture range.

Furthermore, the image information about a field size of a low-powered objective lens for a desired capture position is obtained, the obtained information is divided into areas corresponding to the field size of a high-powered objective lens, it is determined whether or not there is a sample image in each divided area, and a capturing operation is performed only in the position containing a sample image, thereby efficiently generating a high-precision image in a field area of the low-powered objective lens.

Thus, according to the third embodiment, since an observer can capture an image in the minimal field based on a predetermined desired position as a high-precision microscope image using a low-powered objective lens, a high-precision microscopic image in an arbitrary observation position can be quickly and conveniently captured.

In the above-mentioned first through third embodiments, a wide-angle field and high-precision image can be efficiently generated. However, although a wide-angle field and high-precision image can be efficiently generated, the efficient generation of an image cannot be appreciated unless the image can be efficiently observed.

The method of displaying an image observation for observation of a wide-angle field and high-precision image is described below as the fourth embodiment of the present invention.

FIGS. 9A through 9F show the method of displaying an observation image of a high-precision image in the fourth embodiment. FIG. 9A shows a memory concept as a schematic diagram of the data configuration of the memory 23 storing wide-angle field and high-precision image information. FIGS. 9B through 9F are schematic diagrams of the display screen of the monitor 25 including an operation screen display area and an observation screen display area.

Assume that the memory 23 shown in FIG. 9A stores three pieces of RGB image information, for example, on each screen.

In this embodiment, a desired display position, magnification, or area can be specified on the operation screen of the operation screen display area to change the specified position, magnification, or area on the operation screen into the memory address for access to the memory 23, the image information about the memory address is called, and the image according to the called image information is displayed in the observation screen display area of the monitor 25.

For example, as shown in FIG. 9B, when the operation screen of an operation screen display area 42 of the display screen 41 of the monitor 25 is operated, and the display of the entire image is specified, the memory address of the entire image area 43 of the memory 23 is accessed, and the entire image is displayed in an observation screen display area 44 of the display screen 41 of the monitor 25.

As shown in FIG. 9C, an area 45 to be observed in detail after being enlarged based on the entire image displayed above is specified on display image of the observation screen display area 44, and the display magnification of the area 45 is specified by operating the operation screen of the operation screen display area 42 such that an image of a magnification of 25 times can be displayed. Then, memory address of the area 46 in the memory 23 corresponding to the specified area is accessed, and an image according to the image information about an area 46 is displayed at a magnification specified in the observation screen display area 44 as shown in FIG. 9D.

Furthermore, when an image using a objective lens of a magnification of 4 times is displayed, an area 47 to be enlarged and displayed is specified in the display image in the observation screen display area 44 as shown in FIG. 9E, and magnification of an objective lens of 4 times is specified by operating the operation screen of the operation screen display area 42, then the memory address of an area 48 in the memory 23 corresponding to the specified area is accessed, and the image according to the image information about the area 48 is displayed at the magnification specified by the observation screen display area 44 of the monitor 25 as shown in FIG. 9F.

In the above-mentioned example, the image display up to the objective lens of a magnification of 4 times is described, but the present invention is not limited to this application, and the image display can be performed using an objective lens of a magnification of 10, 20, 40, and 60 times, etc. It is realized depending on the magnification of an objective lens when a wide-angle field and high-precision image is generated by the capture using the above-mentioned high-powered objective lens by preparing the image information about an image size of a plurality of stages in the memory 23.

Figure 10:
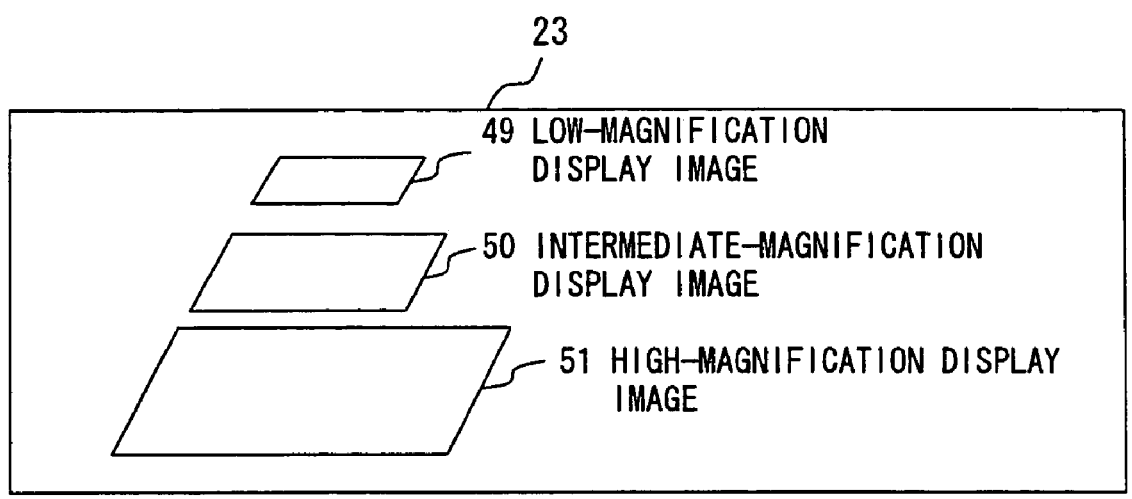
FIG. 10 shows an example of preparing image information about image sizes at plural stages.

FIG. 10 shows an example of preparing the image information about an image size at a plurality of stages. In the example shown in FIG. 10, the memory 23 is provided with three-stage image size image information areas, that is, a low-magnification display image information area 49, an intermediate-magnification display image information area 50, and a high-magnification display image information area 51. Each area stores image information.

The high-magnification display image information area 51 stores the image information obtained by a capturing operation without compression. The intermediate-magnification display image information area 50 stores the image information by thinning the data according to the high-magnification display image information. The low-magnification display image information area 49 stores the image information with the data further reduced.

In FIG. 10 above, a three-stage image memory area is provided, but the present invention is not limited to this application, and the stages corresponding to the magnification of an objective lens of a microscope, for example, the image information about six stages of 1, 2, 4, 10, 20, and 40 times, etc. can be stored in the memory. It is obvious that the magnification is not limited to six stages. By preparing plural stages of image information, the display speed of an image can be enhanced especially when an image of a low-magnification is displayed.

As described above, an observed image can be displayed at the discretion of the observer for a desired position, area, magnification, etc. according to wide-angle field and high-precision image information generated by capturing an image using a high-powered objective lens.

This indicates that a desired observation position, area, and magnification can be controlled by an observer as if a microscope were actually operated by reading wide-angle field and high-precision image information from the memory if the wide-angle field and high-precision image information is generated and the generated image information is stored although there are no microscope or slide at hand. Therefore, if the wide-angle field and high-precision image information obtained as described above is stored in a storage device of a server device connected to a network such as a LAN, etc., then the wide-angle field and high-precision image information can be accessed to make an observation on an arbitrary client device.

Thus, according to the fourth embodiment of the present invention, plural stages of image information can be prepared in the memory according to the wide-angle field and high-precision image information obtained using a high-powered objective lens, any position, magnification, and area can be specified, and the image information can be displayed on the monitor device. Therefore, without an actual microscope, an observation can be made by controlling the position, magnification, and area of a sample on the slide glass as if the observer were actually operating the microscope.

As described above, according to the present invention, a wide-angle field and high-precision microscopic digital image-can be captured only from a divided area containing a sample image, and a divided area containing no sample image is assigned dummy data, thereby generating a composite image. Therefore, although it takes a long time to capture a high-precision image especially when a wide-angle field and high-precision image is to be captured in the conventional technology with an unnecessarily long time wasted in capturing a portion containing no sample image, the present invention can realize efficient capture of a wide-angle field image with high precision.

What is claimed is:

1. A microscopic image capture apparatus for capturing a sample image of a sample, said apparatus comprising:
   a macro capture device for collectively capturing an entire area of a slide glass;
   a macro image information dividing device for dividing image information on the slide glass obtained by the macro capture device into high-magnification size sections corresponding to a magnification of a predetermined high-powered objective lens;
   a sample image discrimination device for checking each of the high-magnification size sections to determine whether there is sample image information of the sample in the obtained image information for each of the high-magnification size sections, and for discriminating (i) each high-magnification size section including the sample image information as a sample image inclusion section and (ii) each high-magnification size section including no sample image information as a sample image exclusion section;

a high-magnification image capture device for capturing high-magnification image information using the predetermined high-powered objective lens only for each said high-magnification size section discriminated as the sample image inclusion section; and an image information generation device generating high-magnification composite image information about the sample on the slide glass by generating a high-magnification image such that a relative position between (i) an area of the high-magnification image corresponding to the high-magnification image information obtained by the high-magnification image capture device and (ii) an area of the high-magnification image corresponding to each said high-magnification size section discriminated as the sample image exclusion section and not captured by the high-magnification image capture device, can be correctly maintained.

2. The apparatus according to claim 1, wherein the image information generation device comprises a dummy data assignment device for assigning dummy data predetermined to be similar to a background of the sample image as image information for each said high-magnification size section in the area of the high-magnification image not captured by the high-magnification image capture device.

3. The apparatus according to claim 1, further comprising an arbitrary image information generation device for generating arbitrary image information having at least one of a different magnification, a different position, and a different area, based on the high-magnification composite image information generated by the image information generation device.

4. A microscopic image capturing method for capturing a sample image of a sample, said method comprising:

collectively macro-capturing an entire area of a glass slide;

dividing image information on the glass slide obtained by the macro-capturing operation into high-magnification size sections corresponding to a magnification of a predetermined high-powered objective lens;

checking each of the high-magnification size sections to determine whether there is sample image information of the sample in the obtained image information for each of the high-magnification size sections, and for discriminating (i) each high-magnification size section including the sample image information as a sample image inclusion section and (ii) each high-magnification size section including no sample image information as a sample image exclusion section;

capturing high-magnification image information using the predetermined high-powered objective lens only for each said high-magnification size section discriminated as the sample inclusion section; and generating high-magnification composite image information about the sample on the slide glass by generating a high-magnification image such that a relative position between (i) an area of the high-magnification image corresponding to the high-magnification image information obtained by the high-magnification image information capturing operation and (ii) an area of the high-magnification image corresponding to each said high-magnification size section discriminated as the sample image exclusion section and not captured by the high-magnification image information capturing operation, can be correctly maintained.

5. The method according to claim 4, wherein the generating operation comprises assigning dummy data predetermined to be similar to a background of a sample image as image information for each said high-magnification size section in the area of the high-magnification image not captured by the high-magnification image information capturing operation.

6. The method according to claim 4, wherein arbitrary image information having at least one of a different magnification, a different position, and a different area is generated based on the generated high-magnification composite image information.

\* \* \* \* \*